United States Patent [19]

Mkhikian et al.

[11] Patent Number: 4,708,628

[45] Date of Patent: Nov. 24, 1987

[54] APPARATUS FOR MOLDING ARTICLES FROM FIBROUS CONCRETE

[75] Inventors: Robert M. Mkhikian; Suren G. Shaginian; Temur G. Markarian, all of Erevan; Georgy K. Khaidukov, Moscow; Sofia V. Velidzhanian, Erevan; Artashes R. Manukian, Moscow; Artur K. Karapetian, Dzhermuk; Aram V. Kazarian; Robert R. Airapetian, both of Erevan, all of U.S.S.R.

[73] Assignee: Nauchno-Issledovatelsky Institut Stroitelstva I Arkhitektury, Erevan, U.S.S.R.

[21] Appl. No.: 937,629

[22] Filed: Dec. 3, 1986

[51] Int. Cl.[4] ........................ B28B 21/14; B29C 39/00

[52] U.S. Cl. .................................... 425/406; 404/105; 425/218; 425/432; 425/447; 425/456

[58] Field of Search ............... 425/253, 256, 258, 406, 425/421, 449, 447, 456, 425, 432, 200, 204, 316, 62, 218, 219; 404/105

[56] References Cited

U.S. PATENT DOCUMENTS

| | | | |
|---|---|---|---|
| 3,217,375 | 11/1965 | Kinnard | 425/218 |
| 3,362,308 | 1/1968 | Austin et al. | 425/456 |
| 3,541,931 | 11/1970 | Godbersen | 404/122 |
| 4,280,800 | 7/1981 | Bunn | 425/62 |
| 4,306,595 | 12/1981 | Longinotti | 425/258 |

*Primary Examiner*—Willard E. Hoag

*Attorney, Agent, or Firm*—Burgess, Ryan & Wayne

[57] ABSTRACT

The proposed apparatus is intended for use in industrial and civil engineering for molding high-strength thin-wall fibrous concrete articles.

The apparatus comprises a stationary tray, and a movable gantry carrying a concrete mixer with a concrete levelling member, and a concrete compacting roller arranged in succession above the tray. The working member has the form of a plurality of rotating rod-like spirals of equal pitch and diameter arranged in the vertical plane to extend through the length of the compacting roller above the tray. The distance between the vertical axes of the adjacent spirals is equal, and is smaller than the diameter of the spirals.

5 Claims, 6 Drawing Figures

APPARATUS FOR MOLDING ARTICLES FROM FIBROUS CONCRETE

This invention relates generally to the production of articles and structures associated with industrial and civil engineering, and more particularly to an apparatus for molding articles from fibrous concrete.

INDUSTRIAL APPLICABILITY

The invention can be used to the utmost advantage in industrial and civil engineering industries for molding high-strength thin-wall (to 10 mm) fibrous concrete articles, such as plates, permanent formworks, linings and fencing structures, overhangs, wall and floor panels, decorative elements, ventilation units, and the like.

The art of manufacturing thin-wall products from fibrous concrete (i.e., concrete reinforced by various dispersed fibres) poses substantial problems due to their ever expanding industrial application. While fibrous concrete mixes are available in a wide range of compositions, the associated concrete molding technology, and consequently machines for molding fibrous concrete are yet to be engineered. In order to obtain thin-wall products of satisfactory physical and mechanical properties, it is necessary that the product be uniformaly and integrally reinforced by fibres through its volume by using low-slump concrete mixes, that is mixes of low water-to-cement ratio; the fibres, like the grains of an aggregate, such as sand, being preferably enveloped by the latiance. Conventional methods are not applicable for molding thin-wall articles from low-slump mixes due to clotting, which results in less integral reinforcement and insufficient strength of the end product.

BACKGROUND OF THE INVENTION

There is known an apparatus for molding articles from fibrous concrete comprising a tray, and a working mechanism in the form of nozzles adapted to spray under pressure binders (such as cement or gypsum), aggregate, water, and fibres. All the ingredients are sprayed layer-by-layer onto the tray until obtaining a product of required thickness.

This prior art apparatus is difficult to manufacture. Another disadvantage is a rather low efficiency of the apparatus and insufficient strength of fibrous concrete products made thereby, since spraying calls for the use of excessive amounts of water, whereby the resulting product lacks the desired uniformity of fiber distribution, and is not homogeneous in terms of density. In addition, since the fibres fail to be sufficiently enveloped by the laitance, it is impossible to obtain products of uniform thickness.

There is also known an apparatus for molding concrete products comprising a hopper with a feeding means, a working member in the form of screw conveyer, and a compacting roller, all mounted in succession on a gantry. The screw conveyer is intended to smooth out the mix on the tray, and is arranged horizontally ahead of the roller (cf., U.S. Pat. No. 3,541,931; Int. Cl. E 01 C 19/22).

This apparatus is inherently disadvantageous because during molding thin-wall articles from fibrous concrete the screw conveyer fails to uniformly place the mix across the tray; the fibrous concrete mix tends to clot to affect the integrity of fibrous reinforcement, which virtually prevents making thin-wall articles from fibrous concrete. In addition, molding articles by this apparatus requires excesive consumption of the initial mix ingredients (such as cement and fibre), thus rendering the end product less cost-effective.

OBJECTS AND SUMMARY OF THE INVENTION

It is an object of the present invention to provide an apparatus capable of producing stronger fibrous concrete articles.

Another object is to reduce the cost price associated with manufacturing thin-wall articles from fibrous concrete.

One more object is to ensure that the thin-wall articles to be used as facing slabs are more reliably bound with a concrete slurry.

Yet another object is to provide more rigid thin-wall fibrous concrete articles.

These and other objects are attained by that in an apparatus for molding articles from fibrous concrete comprising a tray and a gantry capable of moving relative to each other, the gantry carrying a concrete placer having a concrete levelling working member and a compacting roller, all arranged in succession above the tray, according to the invention, the concrete levelling working member of the concrete placer has the form of a plurality of rotating rod-like spirals of equal pitch and diameter arranged in the vertical plane to extend through the length of the compacting roller at an equal distance between their vertical axes, which is smaller than their diameter, with a clearance relative to the tray.

The proposed construction of the working member loosens the mix, uniformly spreads the mix across the tray, and places the mix with a desired thickness. Structural arrangement of the spirals prevents fibres from being wound on the spirals; clot formation in the mix being also prevented. This in turn ensures that the mix is homogeneous to result in improved strength of the article molded by virtue of integral dispersed reinforcement.

In addition, manufacturing cost of the fibrous concrete articles molded by the proposed apparatus is substantially reduced thanks to the application of low-slump mixes with the minimum of cement and fibre.

In one preferred embodiment of the present invention coil pitch of each spiral is 3 to 10 times the diameter of the rod from which the spiral is made. The choice of pitch within this range provides the most efficient operation of the working member. A smaller pitch may entail jamming of the spirals, whereas a greater pitch fails to ensure efficient placement of the mix on the tray.

Advisably, the diameter of each spiral is 1 to 2 times the length of fibres. A smaller diameter of the spiral may cause mechanical damage of the fibres to affect the quality of the end product; another accompanying disadvantage being the tendency of the fibres to be wound onto the spiral, which results in non-uniform spread of the mix on the tray, and consequently in a failure to obtain a homogeneous and integral fiber reinforcement. An increase in the spiral diameter causes excessive scatter of the mix.

According to one feature of the present invention, the distance between the longitudinal axes of the neighbouring spirals is 0.6 to 0.8 of their diameter.

An increase in this distance causes non-uniform spread of the mix on the tray. If the distance between the axes of the adjacent spirals is reduced, the spirals tend to get jammed to result in fiber damage.

One alternative embodiment of the apparatus according to the invention is provided with an additional roller having disk blades arranged on the gantry after the compacting roller. The roller has annular or arcuate grooves disposed perpendicularly to its longitudinal axis. Some of the spirals are preferably shorter than others, whereas each such shorter spiral, arcuate groove, and disk blade are arranged successively one after another in one vertical plane.

The provision of the additional roller, and the use of the compacting roller with arcuate grooves makes it possible to form thin-wall articles with ribs and anchoring projections, for example, in the form of dove tails, promoting a better bonding of thin-wall products, such as wall panels for facing buildings. Also, the provision of ribs and anchoring projections ensures higher rigidity of fibrous concrete products.

BRIEF DESCRIPTION OF THE ACCOMPANYING DRAWINGS

Other objects and attending advantages of the present invention will become more fully apparent from a detailed description of specific embodiments thereof that follows, taken with reference to the drawings, in which.

DETAILED DESCRIPTION OF THE INVENTION

Figure 1:
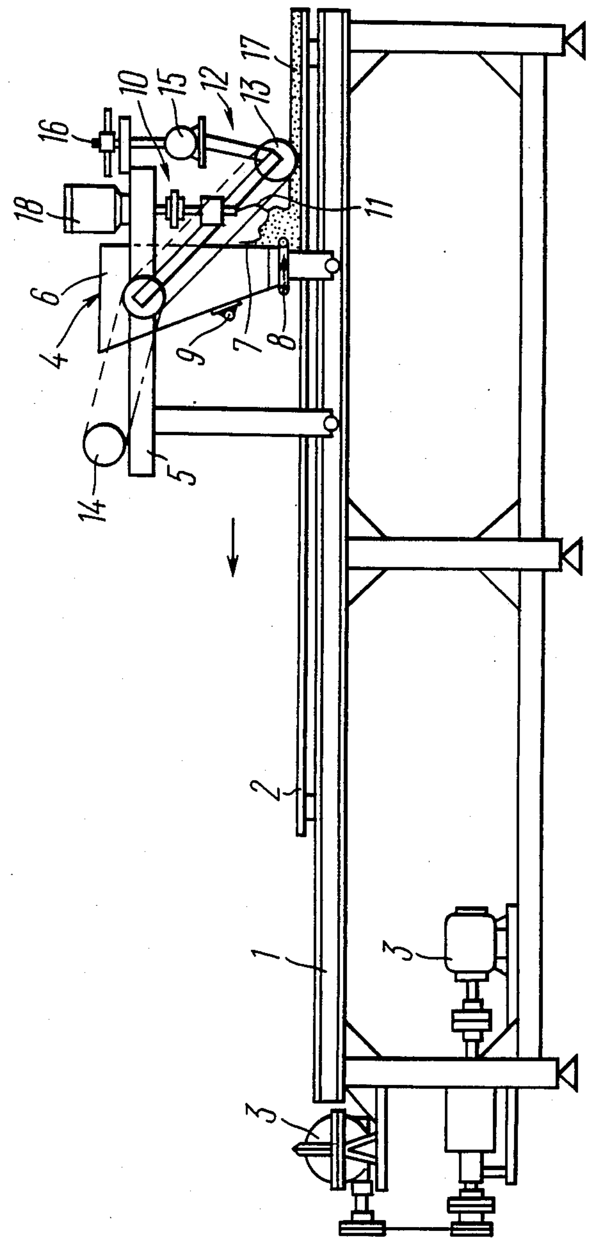
FIG. 1 is a side view of the proposed apparatus for molding fibrous concrete articles.

Exemplified hereinafter are apparatus for molding articles from a thin (to 10 mm) sheet fibrous concrete.

EXAMPLE 1

The apparatus embodying the present invention comprises a frame 1 (FIG. 1) on which there are mounted a tray 2 and a drive 3 of a concrete placer 4 secured on a gantry 5 and including a hopper 6 with a gate 7 and feeder 8, a vibrator 9 disposed at the hopper 6, and a concrete levelling working member 10 having the form of rotating spirals 11. Arranged after the concrete placer 4 at the gantry 5 is a compaction mechanism 12 comprising a compaction cylindrical roller 13 with a drive 14, a vibrator 15, and a means 16 for adjusting the position of the roller 3.

Concrete mix 17 from which articles are molded in shown on the tray 2. The working member 10 has a drive means 18, and is secured vertically after the hopper 6 before the compacting roller 13 to extend through the length of the roller 13.

Figure 2:
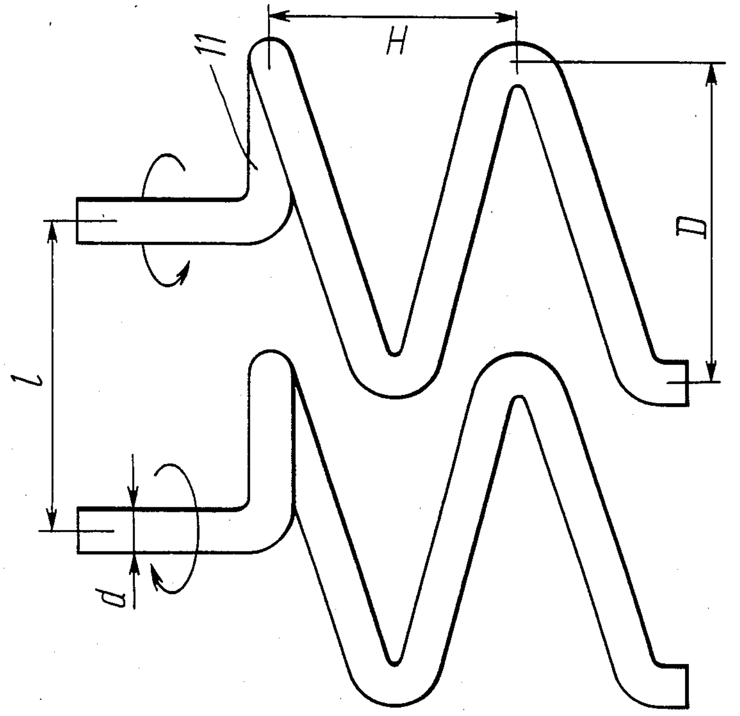
FIG. 2 shows a pair of adjacent spirals of the working member of a concrete placer.

All the spirals 11 (FIG. 2) have equal pitch H and diameter D, and are spaced at equal distances l between their respective vertical axes in each adjacent pair, this distance l being substantially smaller than the diameter D of the spirals 11.

The spirals 11 are arranged above the tray 2 in one vertical plane with a predetermined clearance depending in magnitude on the required thickness of the article being molded.

The coil pitch H of each such spiral 11 equals 3 to 10 diameters d of the rod from which it is fabricated, whereas the diameter D of the spiral ranges from 1 to 2 lengths of the fibres. The distance l is preset in the range 0.6 to 0.8 of the diameter D of the spirals 11.

The apparatus operates in the following manner.

Depending on the thickness of the article being molded, the spirals 11 are accordingly mounted above the tray 2 (FIG. 1), and the roller 13 is set in position by the means 16.

A preliminary prepared fibrous concrete mix 17 having a minimum amount of water therein is charged to the hopper 6 of the concrete placer 4.

The drive 3 of the concrete placer 4 is energized for the concrete placer 4 to move toward the tray 2, and after the concrete placer 4 has reached the edge of the tray 2, the gate 7 of the hopper 6 opens, the feeder 8 is actuated, and the vibrator 9 of the hopper 6 and the drive 18 of the working member 10 of the concrete placer 4 are energized. As the travel of the concrete placer 4 continues, the mix 17 is delivered to the tray 2. The working member 10 of the concrete placer 4 arranged vertically and extending through the width of the article being molded acts to uniformly loosen, spread, and place the mix on the tray 2 with a desired thickness.

When the roller 13 is brought in contact with the mix 17 on the tray 2, the drive 14 of the roller 13 and the vibrator 15 are energized. While rotating in a direction opposite to the travel of the tray 2, the roller 3 acts to compact the mix, and smooth out the surface of the article being molded. The gantry 5 moves until the roller 13 compacts the surface of the article being molded, after which all the mechanisms of the apparatus are disengaged in the same sequence. The tray 2 with the molded article is removed from the frame 1, the gantry 5 is returned to its initial position, and the entire process is recommenced.

The vibrator 9 serves to prevent setting of the concrete mix in the hopper 6 during the delivery of the mix 17 to the feeder 8 having, for example, the form of a belt conveyer.

In the present Example the gantry 5 with the concrete placer 4 and compacting mechanism 12 move relative to the stationary try 2. However, in other alternative native modifications of the apparatus according to the invention, the tray can move, whereas the concrete placer 4 and compacting mechanism 12 remain immobile.

For obtaining articles with decorative surfaces the roller 13 can have a knurled surface, or the article can be molded in the "face down" manner. In this case use can be made of molds which, depending on the architectural concept, occupy the entire tray, or only part thereof. For producing articles with a curvilinear surface a curvilinear tray 2 is used.

EXAMPLE 2

In this example there is described an apparatus (FIG. 3) for molding a thin sheet of fibrous concrete with anchoring ribs in the form of dove tails to be used, for example, as permanent forms in the erection of buildings from monolithic concrete.

As distinct from the apparatus represented in FIG. 1, this apparatus comprises additional roller 19 with a vibrator 20, and a means 21 for adjusting the position of the roller 19 arranged after the compaction mechanism 12.

Figure 4:
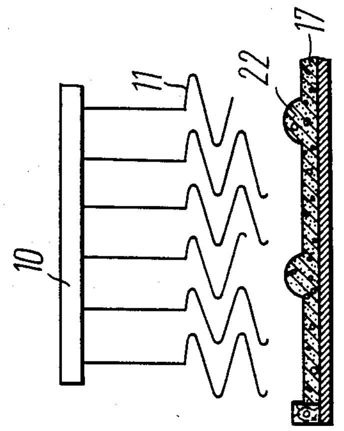
FIG. 4 shows a working member of the concrete placer represented in FIG. 3.
Figure 5:
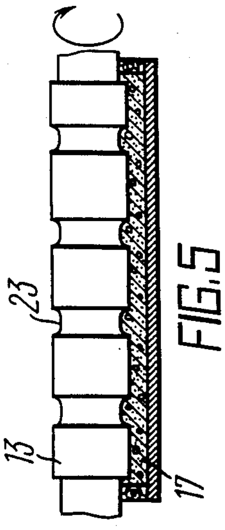
FIG. 5 shows a compacting roller of the apparatus represented in FIG. 3.
Figure 6:
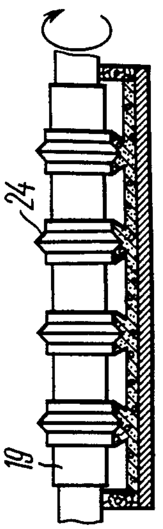
FIG. 6 shows another roller of the apparatus represented in FIG. 3.

In the working member 10 of the concrete placer 4 some spirals 11 (each third in succession as shown in FIG. 4) are shortened for molding ribs 22 from the mix 17. With reference to FIG. 5, the compacting roller 13 is provided with arcuate grooves 23, whereas the additional roller 19 has disk blades 24 (FIG. 6), each such shortened spiral 11, arcuate groove 23, and disk blade 24 being arranged successively one after another in one vertical plane.

The clearance between the shortened spirals 11 and tray 2 corresponds to the height of the ribs 22 being molded.

Figure 3:
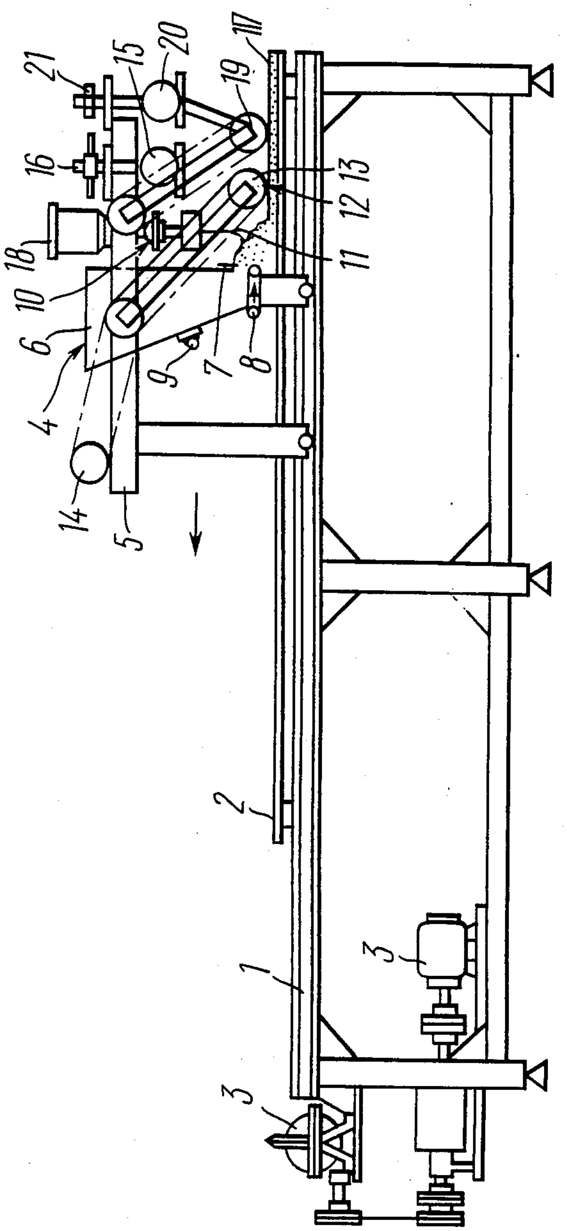
FIG. 3 is a side view of the proposed apparatus for molding fibrous concrete articles with anchoring ribs.

The apparatus shown in FIG. 3 operates generally in the same manner as the one illustrated in FIG. 1.

A ready fibrous concrete mix 17 containing a minimum of water is charged to the hopper 6 of the concrete placer 4. The tray 2 is mounted on the frame 1. The drive 3 of the concrete placer 4 is then energized to move the placer 4 toward the tray 2, and upon reaching the edge of the tray 2 the gate 7 of the hopper 6 opens, and the feeder 8, vibrator 9 and working member 10 of the concrete placer 4 are actuated. The mix 17 is fed to the tray 2. The working member 10 arranged vertically to extend through the width of the article being formed acts to uniformly loosen, spread and place the mix onto the tray 2 with a desired thickness. At locations, where the spirals 11 are shortened these spirals leave bumps of the concrete mix for the ribs 22 to be formed.

When the roller 13 is brought in contact with the mix 17, on the tray 2, the drive 14 of the roller 13 and vibrators 15 and 20 are energized. The roller 13 acts to compact the mix and smooth out the surface of the article being molded. Ribs 22 are formed at the surface of the article by the arcuate grooves 23. After the passage of the additional roller 19 with the disk blades 24, the article is finally formed to have ribs 22 shaped as dove tails.

Subsequent to molding, the finished article with the tray 2 is removed for drying, and a new tray 2 is mounted on the frame 1.

All the articles have the following composition:

Cement of 40–50 MPa activity—41.7%;

Aggregate (quartz sand)—41.7%

Fibre (alkali resistant glass fibre 40–50 mm in length)—2%;

Water—14.6%.

Bend tests of plate articles 2000 mm long, 2000 mm wide and 10 mm thick on two supports and at a uniformly distributed loads have shown that 1 $m^2$ of the fibrous concrete plate is capable of withstanding a weight of up to 800 kg.

The output capacity of the apparatus is 100 $m^2/h$ at a width of 1500 mm, thickness of 8 to 40 mm, and length of 6000 mm of the articles being molded.

The apparatus according to the invention is 5 times more efficient than prior art apparatus, where concrete mix is sprayed on the tray 2, whereas the range of articles which can be fabricated is much wider. The proposed apparatus is capable of making articles and structures of a configuration unattainable by using the spraying technique.

The rate of cement consumption for making fibrous concrete articles by the proposed apparatus is minimized in contrast to the apparatus using the spraying technique, where the amount of cement consumed during the fabrication process by far exceeds the minimum sufficient for obtaining articles of desired strength.

What is claimed is:

1. An apparatus for molding articles from concrete containing fibers comprising:

a frame;

a tray mounted on said frame;

a gantry mounted on said frame;

said tray and gantry being capable of relative movement;

a concrete placer having a concrete levelling working member mounted on said gantry;

a compacting roller provided on said gantry after said working member;

said concrete levelling working member having the form of a plurality of rotable rod-like spirals of equal pitch and diameter arranged in the vertical plane to extend through the length of said compacting roller at an equal distance between their vertical axes, which is smaller than their diameter, with a clearance relative to said tray.

2. An apparatus as defined in claim 1, in which the pitch of the coil of each said spiral is 3 to 10 times the diameter of the spiral rod.

3. An apparatus as defined in claim 1, in which the diameter of each spiral is 1 to 2 times the length of said fibers.

4. An apparatus as defined in claim 1, in which the distance between the vertical axes of the adjacent spirals is 0.6 to 0.8 of their diameter.

5. An apparatus as claimed in any one of claims 1 to 4, in which there is provided an additional roller having disk blades arranged after the compacting roller with arcuate grooves perpendicular to its longitudinal axis, some of the spirals having a length smaller than the length of other spirals, whereas each such shortened spiral, arcuate groove and disk blade are arranged in succession one after another in one vertical plane.

* * * * *